Figure 1:
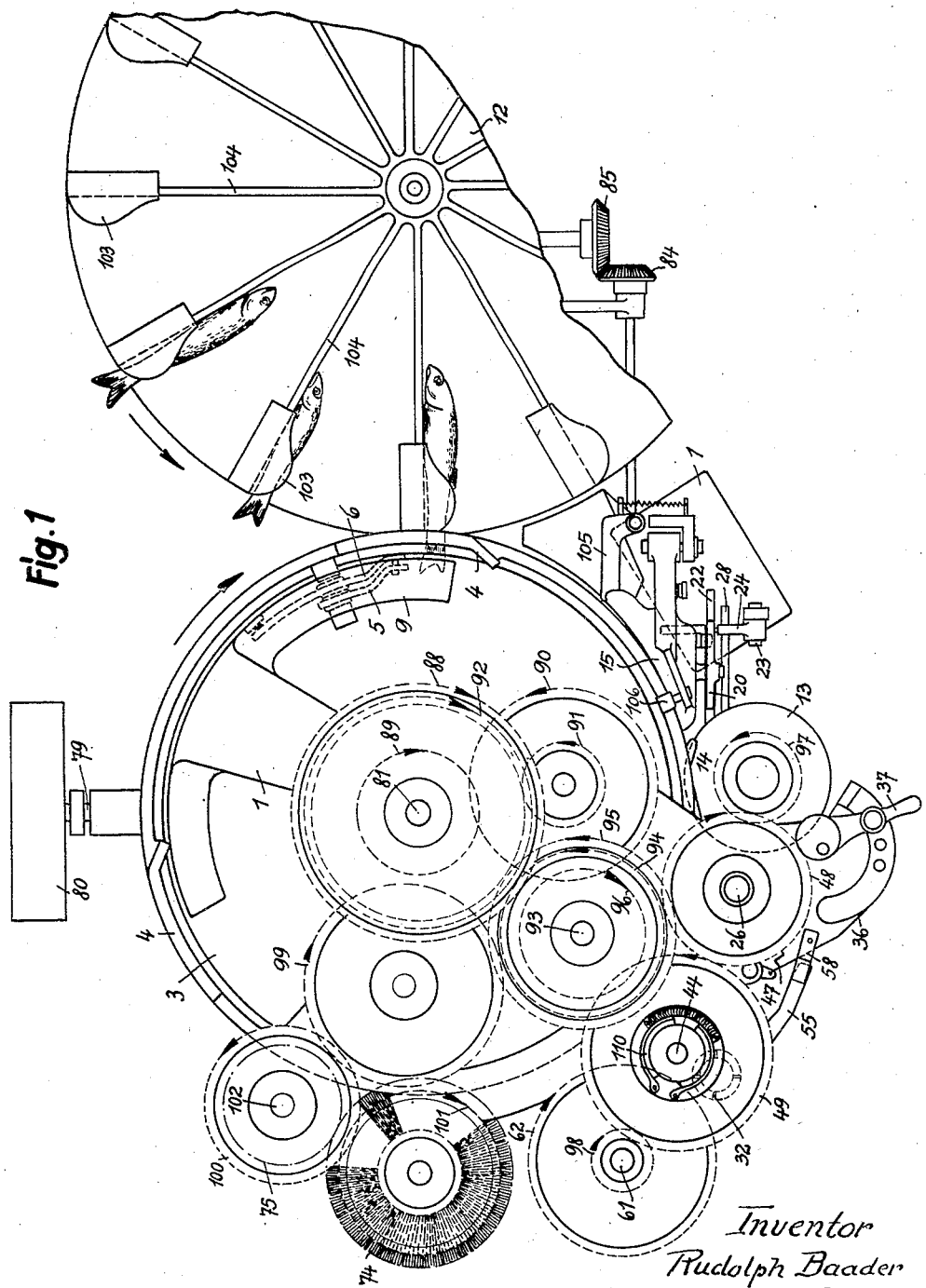

Jan. 28, 1930.  R. BAADER  1,744,726
APPARATUS FOR SPLITTING OPEN, CLEANING,
AND REMOVING THE GILLS FROM HERRINGS
Filed Dec. 4, 1928  4 Sheets-Sheet 1

Inventor
Rudolph Baader
by
Attorney

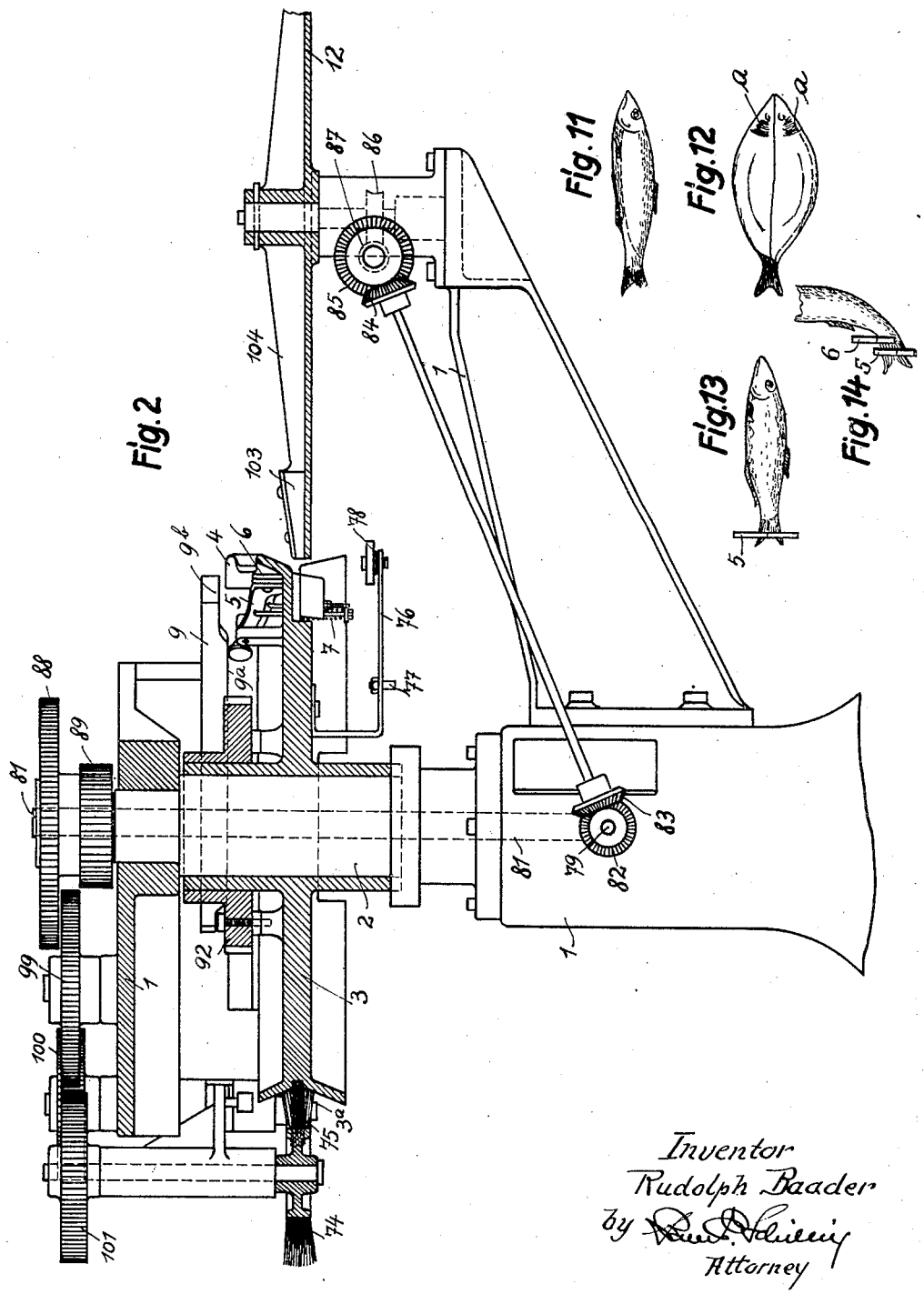

Jan. 28, 1930.                R. BAADER                   1,744,726
           APPARATUS FOR SPLITTING OPEN, CLEANING,
           AND REMOVING THE GILLS FROM HERRINGS
                    Filed Dec. 4, 1928           4 Sheets-Sheet 3
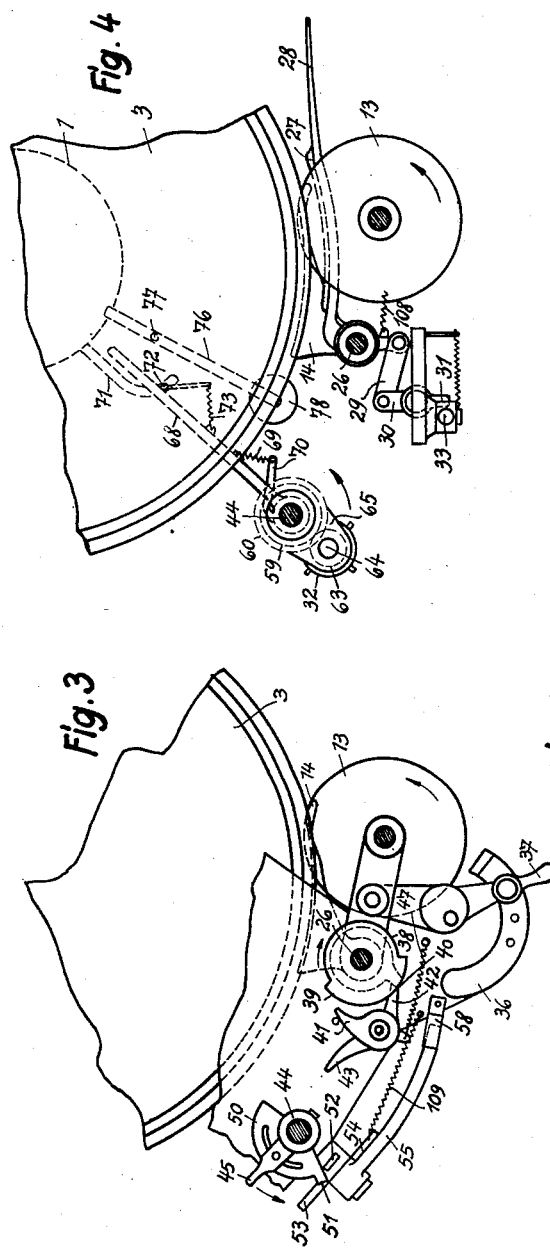
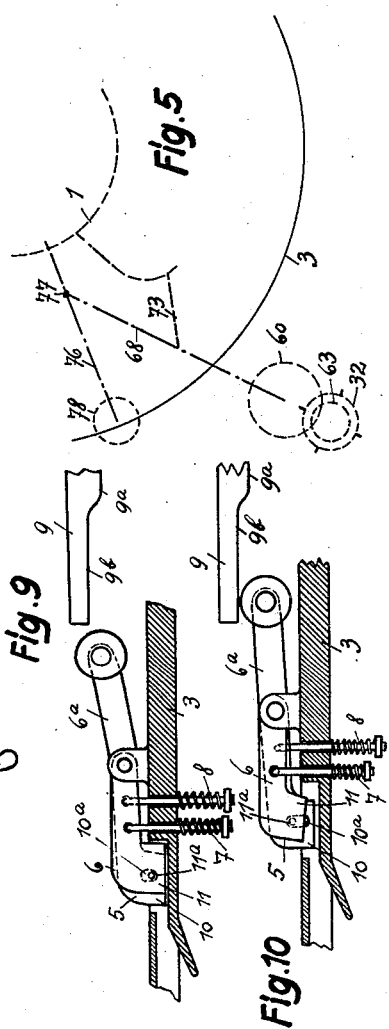
Inventor
Rudolph Baader
by
Attorney

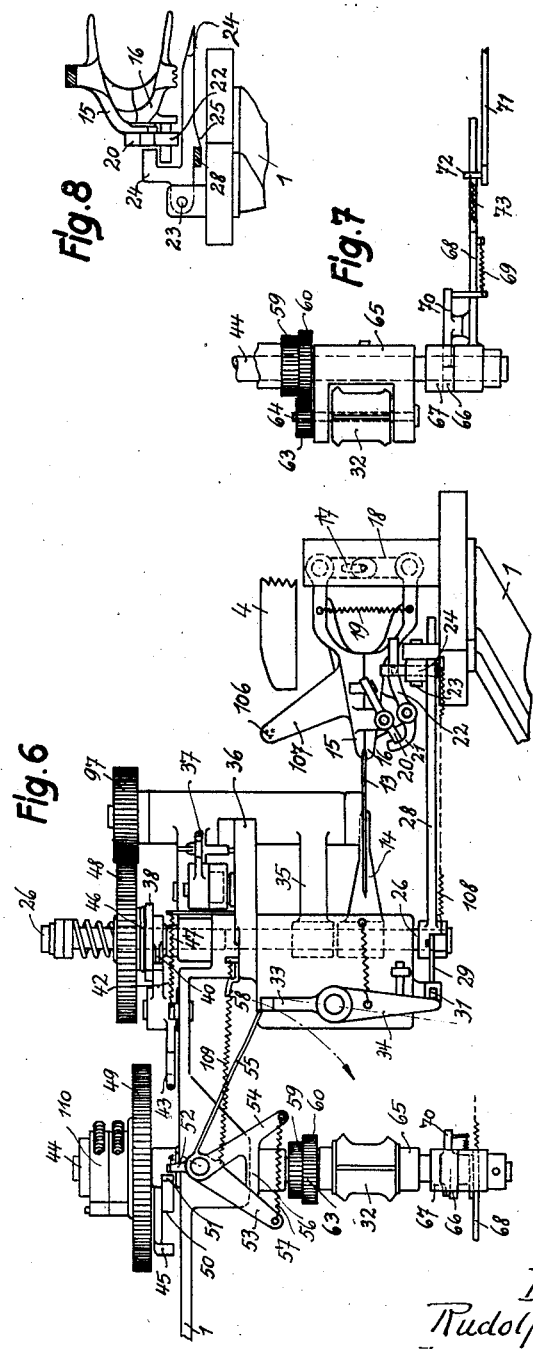

Patented Jan. 28, 1930

1,744,726

UNITED STATES PATENT OFFICE

RUDOLPH BAADER, OF LUBECK, GERMANY

APPARATUS FOR SPLITTING OPEN, CLEANING, AND REMOVING THE GILLS FROM HERRINGS

Application filed December 4, 1928, Serial No. 323,708, and in Germany June 27, 1928.

The subject of the present invention is an apparatus for splitting open, cleaning and removing the gills from herrings, in other words a kippering machine. In this machine, the herrings are gripped at the tail fins in the known manner by means of clamps and are held securely during their circulatory operative run through the machine, during which they are first cut open on one side of the backbone from the back throughout their full length from the root of the tail to and including the head, and opened out flat, whereupon the two gills located in the two halves of the head, are taken out without regard to the length of the fish or of its head. The machine operates completely automatically and any special adjustment of the tools by hand is not necessary.

A constructional example of the apparatus is illustrated on the accompanying drawing, in which:—

Fig. 1 is a plan, and
Fig. 2 a vertical section,
Figs. 3, 4 and 5 are plans of the contrivances for cutting open the fish and taking out the gills, and
Figs. 6, 7 and 8 are side elevations thereof.
Figs. 9 and 10 are side elevations of a tail clamp.
Figs. 11 and 12 show respectively a herring in side elevation and cut open, with the gills still attached.
Figs. 13 and 14 show how a herring is held during its travel through the machine.

On the shouldered spindle 2, mounted fast in the frame 1 of the machine, are journalled a trimming wheel comprising two horizontally rotated discs 3, integrally interconnected and of known type in fish preparing machines. The borders of these discs are directed outwards at an obtuse angle to one another. On the upwardly directed border of the double disc 3, guide flanges 4 are provided, whereas the downwardly directed border is gapped. On the disc 3 are a plurality of double clamping levers 5, 6, influenced by springs 7, 8 and so operated by a cam track 9, that first the foot 10 of the clamping lever 5 and thereupon the foot 11 of the clamping lever 6 is applied over the tail fins of a fish, introduced into the operative run of the machine by a rotating feed wheel or frame 12. In the foot 10 is a slot $10^a$, and in the foot 11 a pin $11^a$, which is guided in the slot $10^a$.

Arranged adjacent to the double disc 3 are the tools for cutting open, removing the gills and cleaning the fish. A swingingly mounted disc knife 13 serves for cutting open the fish, which knife runs in a slit in a guide block 14, which spreads open the cut open fish and presses against the periphery of the disc 3.

In front of the knife 13 and in the same plane is a tongs-like feeler, the two jaws 15, 16 open under the influence of the introduced fish, and, as they are interconnected by levers 17, 18, open equally upwards and downwards, and close by the action of a spring 19, after the fish has been passed through. On the jaw 15 is a pawl 20, which engages in a pawl 21 on the jaw 16, the arm 22 of which pawl 21 is in engagement with a lever 24 pivotally mounted at 23. On the lever 24 is a nose 25, which retains a lever 28, provided with a cam surface 27, rotatably mounted on a shaft 26, which lever is connected by means of a link 29 to a two armed lever 30, 31, the arm 31 of which controls the swinging outwards of a rotatably mounted spring-loaded double armed lever 33, 34. Loose on the shaft 26 is the carrier 35 of the disc knife 13, which carrier is connected to an eccentric lever 37 which is adapted to be held by an apertured segment 36. Moreover, loose on the shaft 26 is a spurwheel 48 and also a cam disc 38, beneath which an abutment 40 is provided, and adjacent to the shaft 26 a detent is rotatably mounted, a pawl 41 of which is in engagement with the cam 39 of the cam disc 38, and a pawl 42 of which is in engagement with the abutment 40, whereas an arm 43 serves as an abutment for an arm 45 mounted on a shaft 44. In the position of rest, the abutment 40 bears firmly against the pawl 42, whereby the cam disc 38 is held stationary, whilst, after release of the pawl 42 by the arm 45, it is carried around by a friction clutch 46. The detent 41, 42, 43 is under the influence of a spring 47.

On the shaft 44 is a spurwheel 49 provided with a friction clutch 110, and fast therewith an abutment disc 50, on which the arm 45 is adjustable. An abutment 51 of the disc 50 is in engagement with an abutment 52 mounted on an arm 53 of a three armed lever rotatably mounted on the frame 1 of the machine. An arm 54 of the three armed lever has an abutment 56, against which the arm 53 is yieldingly held by a spring 57 interconnecting the two arms 53, 54. An arm 55 is held on the one hand by an abutment 58 and on the other hand by the lever arm 33. Loose on the shaft 44 are two interconnected pinions 59 and 60, of which the pinion 59 gears with a spurwheel 62 mounted on a shaft 61 and the pinion 60 gears with a pinion 63 mounted on a carrier 65 fast with the shaft 44. On the spindle 64 fast with which pinion 63 is keyed a bladed or milling wheel 32 mounted in the carrier 65. Fast on the shaft 44 is mounted a disc 67 provided with a nose 66, and loose on the shaft 44 is mounted a lever 68, on which is provided a pawl 70, influenced by a spring 69, which is in engagement with the nose 66 of the fast disc 67. The lever 68 encounters a pin 72, adjustably mounted in a rail 71 attached to the machine frame 1, against which the lever 68 is held by a spring 73.

Brushes 74 and 75 serve in the known manner as tools for cleaning the fish.

Beneath the disc 3 are secured levers 76, on which are arranged an abutment pin 77 in engagement with the lever 68 and also a roller 78 in engagement with the cam surface 27 of the lever 28.

In the constructional example illustrated, the machine is so arranged that three fishes are simultaneously in the working run; whilst one fish is being grasped by the clamps 5, 6 at the tail fins, another fish is being operated upon and a further fish is about to be dropped.

The drive of the machine is effected by a belt pulley 80 mounted on a shaft 79, the rotation of which is transmitted by means of bevel wheels (not shown) to a shaft 81, and by means of bevel wheels 82, 83, 84, 85 and a worm 87 and worm wheel 86 to the frame 12. Fast on the shaft 81 are mounted spurwheels 88, 89. The spurwheel 89 gears with a spurwheel 90, and a pinion 91 fast with the latter and mounted on the same shaft gears with a spurwheel 92 connected to the double disc 3, whereby the disc 3 receives its rotation, which is appropriately faster than the rotation of the frame 12. On the shaft 93 a spurwheel 96 and a double spurwheel 94, 95 are freely mounted. The spurwheel 94 transmits the movements of the spurwheel 88 through the medium of the spurwheel 95 fast with the former, to a spurwheel 48 on the shaft 26, and the spurwheel 48 gears with a spurwheel 97 mounted on the same shaft as the disc knife 13, whereby the knife 13 is rotated. The spurwheel 96 transmits the movements of the spurwheel 90 to a spurwheel 49 mounted on the shaft 44, whereby, by means of a pinion 98 mounted on a shaft 61, a spurwheel 62, in engagement with the pinion 59, is rotated. By a spurwheel 99 gearing with the spurwheel 95, is driven a spurwheel 100, mounted on the same shaft as the cleaning brush 75, which gears with a spurwheel 101, whereby the brush 74 swingably mounted about the shaft 102 of the spurwheel 100, is rotated.

The above described machine operates as follows:

The fresh or salted herrings which are to be treated, are singly so placed in the compartments 103 provided therefor on the frame 12, that they rest with their bellies against the ledges 104, whilst the tail fins extend outwards over the periphery of the disc frame into the operative path of the machine as far as to be directly beneath the tail clamps 5, 6. The tail clamps are first held open by the cam track 9 (Fig. 2). On rotation of the disc 3, the arm 6ª of the clamping lever 6 slides from the cam surface 9ª on to the cam surface 9ᵇ, whereby first the foot 10 of the clamping lever 5 is placed on the tail fins (Figs. 10 and 13) whereupon the fish is bent at the root of the tail (Fig. 13) by the spring loaded abutment 105. Hereupon the lever 6ª leaves the cam surface 9ᵇ, so that the foot 11 of the clamping lever 6 also is placed on the tail fins (Fig. 13). By this double clamping it results that the backbone of the fish at the root of the tail where it is bent, does not break. It can bend without straining the tail flesh because during the straight introduction it is held only one sidedly, and is again clamped in the bent condition, whereby also the tendency is imparted to the fish to bend back into the extended position. The fish now lies with its belly firmly in the middle groove 3ª of the disc 3 and arrives so between the jaws 15, 16 of the feeler tongs. At the same time the guide ledge 4 runs beneath the roller 106 of the arm 107 mounted on the jaw 15, whereby the opening of the feeler tongs is initiated and an excessive pressure of the jaws of the tongs on the fish is avoided. The feeler tongs then open wider whilst straining the spring 19, in accordance with the thickness of the fish. On the opening of the feeler tongs, the pawl 20 mounted on the jaw 15 is lifted out of the pawl 21 mounted on the jaw 16, by swinging about its pivot. By the action of the spring 19, the feeler tongs 15, 16 close at the instant when they are left by the point of the head of the fish. During this the following occurs:—

When the jaws 15, 16 close together, the pawl 20 encounters the pawl 21, whereby the latter swings out and by its arm 22 raises the lever 24, so that the nose 25 thereof frees the lever 28. By the action of the spring 108, the lever 28 swings, whereby through the medium of the link 29 the double armed lever 30, 31 is moved, the arm 31 of which causes the lever 33, 34 to swing.

Until this instant, the cam disc 38 is held by the abutment 40 bearing against the pawl 42, and the arm 45 fast with the shaft 44 is held by the abutment 51 bearing against the abutment 52. The shaft 44 therefore stands still, so that although the bladed or milling wheel 32 is rotated about its own axis through the medium of the spurwheels 62, 59, 60, 63, it does not swing about the shaft 44 (Figs. 3 and 6).

As soon, however, as the abutment lever 33, 34 swings out (Fig. 6 dot-dash position), the lever 55 is freed, whereby under the load of the abutment 51 the three armed lever 53, 54, 55 is swung against the action of the spring 109, so that by the clutch 110 connected to the spurwheel 49 the shaft 44 with its tool 32 is set in rotation.

In the meantime the fish has been split along the back by the knife 13 on one side immediately adjacent to the back-bone, and the two halves of the fish are spread out on the periphery of the disc 3. The cut by the knife 13 immediately adjacent to the backbone is effected, by no kinks arising in the plane of the body of the fish on bending the root of the tail and by the feeler tongs simultaneously serving as a guide to hold the fish correctly in the cutting plane of the knife. The rotation of the tool 32 starts at the instant when the head of the fish has left the feeler tongs. From there onwards the point of attack for the tool is determinable by the speed of rotation of the disc 3, relatively to the swinging movement of the tool 32 about the shaft 44, so that the tool 32 enters immediately at the end of the head. The point of attack is first determined to suit approximately the smallest herrings received for treatment. In treating larger herrings, which have a correspondingly longer head, the tool is positively adjusted to suit such longer heads, as will be described later.

On rotation of the shaft 44 the arm 45 encounters the arm 43 and causes this to swing out, whereby also the pawls 41, 42 are moved against the action of the spring 47. The pawl 42 releases the abutment 40, whereby the cam disc 38 is clutched by the clutch 46 to the spurwheel 48 and is set in rotation. By the load imposed by the arm 45 on the arm 43 the pawl 41 is firmly pressed against the cam 39 and thereby prevents swinging out further of the arm 43, which on its part thereby maintains the arm 45 and therewith the tool 32 so long and directly in the operative position, until the pawl 41 is left by the cam 39, so that the arm 43 can swing out further and allows the arm 45 to pass. The pause imposed in the rotary movement of the tool about the shaft 44, is necessary, at the instant when it comes into engagement with the gills of the fish a (Fig. 12), in order to grip and tear them out for their entire length during the passage of the fish. The tool rotates oppositely to the disc 3.

After the gills have been taken out, the belly cavity of the fish is cleaned by the brushes, and when the tail clamps run beneath the guide ledge 4 and open, the fish falls out of the operative run of the machine.

The pawls and levers, which are under spring influence are returned to the initial position by the springs, and the lever 28 by the lever 76, by the roller 78 encountering the guide surface 27.

When in treating a larger herring the closure of the feeler tongs 15, 16 is delayed by the longer head of the fish, the distance from the end point (reckoned from the point of the head) of the gills to the operative position of the tool 32 correspondingly shortens. This difference is compensated by the tool being so far turned in advance in the direction of its rotation, as the head of the fish to be treated is longer than the head of approximately the smallest fish. The lever 68 mounted free on the shaft 44 assumes relatively to the tool 32 a definite position, which is adjustable by the abutment pin 72. Against this lever 68 strikes the pin 77 of the lever 76 rotating with the disc 3 and allows the lever 68 each time to swing out until the pin 77 slides off the lever 68 and the latter is moved back to the initial position by the action of the spring 73. On treatment of one of approximately the smallest herrings the pin 77 encounters the lever 68 at the instant when the shaft 44 receives its drive and the tool its planetary motion. If the drive of the shaft 44 is delayed by a longer fish, the pawl 70 mounted on the lever 68 taken along the shaft 44 by its engagement with the nose 66 of the disc 67 fast with the shaft 44, and thereby brings the tool more into its working position and shortens its path (Fig. 5). If the lever 68 makes a full swing carrying therewith the shaft 44, the thus obtained advance of the tool corresponds with the length of approximately the largest fish arriving for treatment. On pre-rotation of the shaft 44 by the lever 68 the abutment disc 50 is also rotated. The abutment 52 in engagement with the abutment 51 is mounted on the lever arm 53, which is connected by means of the spring 57 to the lever arm 54. When therefore the shaft 44 and therewith the abutment disc 50 is rotated, the abutment 52 can correspondingly yield, by the lever arm 53 swinging out against the action of the spring 57. As soon as the shaft 44 receives its drive, the lever arm swings under the influence of the spring 57 back into the initial position and sets itself against the abutment 56. The power of the spring 57 is arranged to be such that it exceeds the action of the clutch 110.

The apparatus is capable of being variously modified in respect of the construction of the driving and operating members. The arrangement must however be such that the tool for removing the gills, which may even be of tongs like structure, stands in the working position and correspondingly lingers, when the head runs past the working position.

Having now particularly described and ascertained the nature of my said invention and in what manner the same is to be performed, I declare that what I claim is:—

1. An apparatus for splitting and removing the gills from fish, comprising means for supporting the fish and moving it through a working path, means for splitting the fish along the line of the backbone, means for spreading the split fish open, and means operating on the split and spread out fish for removing the gills.

2. An apparatus for splitting and removing the gills from fish, comprising means for supporting and conveying the fish through a working path, means for splitting the fish along the line of the backbone, means for spreading the split fish open, and a gilling tool movable into and out of the work path and operative for movement into the work path so as to engage the head of the spread out fish and to remove the gills therefrom.

3. An apparatus for splitting and removing the gills from fish comprising a rotary carrier disk, a rotary feed disk for feeding a fish tail end first toward the periphery of the carrier disk, a clamp on the carrier disk to engage the tail of the fish, means coacting with the disks during their rotation to turn the fish so as to bring it stomach side inward against the periphery of the carrier disk, a second clamp to engage the tail of the fish after it is brought into the latter-named position, tongs for engaging the fish and holding it in such position, a cutter to act upon the fish along a line at one side of its backbone to split it longitudinally, means for spreading the fish against the periphery of the disk, and a gilling tool operative to remove the gills from the spread fish.

4. An apparatus for splitting and removing the gills from fish, comprising means for clamping and moving a fish through a working path, means for engaging and holding the fish in proper position for a splitting operation while moving in said path, a cutter for splitting the fish along a line parallel with the backbone, means for spreading the split fish open, and a gilling tool arranged to swing into and out of said working path and operative at a proper time period for movement into said path to engage the fish and remove the gills therefrom.

5. An apparatus of the character set forth in claim 4 wherein the means for supporting and conveying the fish through a working course includes a rotatable member against the periphery of which the fish is bent, and in which cam-operated primary and secondary clamps are provided to engage the tail of the fish before and after it is bent.

6. An apparatus of the character set forth in claim 4 in which spring-actuated feeler tongs are provided for holding and guiding the fish with its middle portion properly centered with relation to the splitting cutter and gilling tool.

7. An apparatus of the character set forth in claim 4 in which feeler tongs are provided for engaging and holding the fish in proper position for action thereon by the splitting and gilling tools, and in which means are provided, automatically operative in the action of the machine, for opening and closing said tongs.

8. An apparatus of the character set forth in claim 4 in which the gilling tool comprises a rotary gilling wheel, the rotation of which is effected independently of its swinging motion.

9. An apparatus of the character set forth in claim 4 in which the fish is transported through the working path by a carrier disk, and the gilling tool comprises a rotary member rotatable inversely to the rotation of the disk.

10. An apparatus of the character set forth in claim 4 in which the fish is moved through its working path by a rotary carrier disk and the gilling tool comprises a swinging and rotary element having a working range beyond the periphery of the disk.

11. An apparatus of the character set forth in claim 4 in which the fish is moved through its working path in a plane bringing its backbone at one side of and parallel with the plane of movement of the splitting device, the latter comprising a rotary cutting disk.

12. An apparatus of the character set forth in claim 4 in which mechanism for feeding the fish to the gilling tool and controlling the motion of the latter is provided, whereby the operative distance traveled by the fish between the splitting and gilling points is automatically compensated for to effect a timed movement of the gilling tool into working position according to the length of the fish.

In testimony whereof I affix my signature.

RUDOLPH BAADER.